Jan. 7, 1964  B. S. LIBY ETAL  3,116,561
APPARATUS FOR USE IN TRUING THE ENDS OF WELDING FITTINGS
Filed Sept. 15, 1959  3 Sheets-Sheet 1

Jan. 7, 1964 B. S. LIBY ETAL 3,116,561
APPARATUS FOR USE IN TRUING THE ENDS OF WELDING FITTINGS
Filed Sept. 15, 1959 3 Sheets-Sheet 2
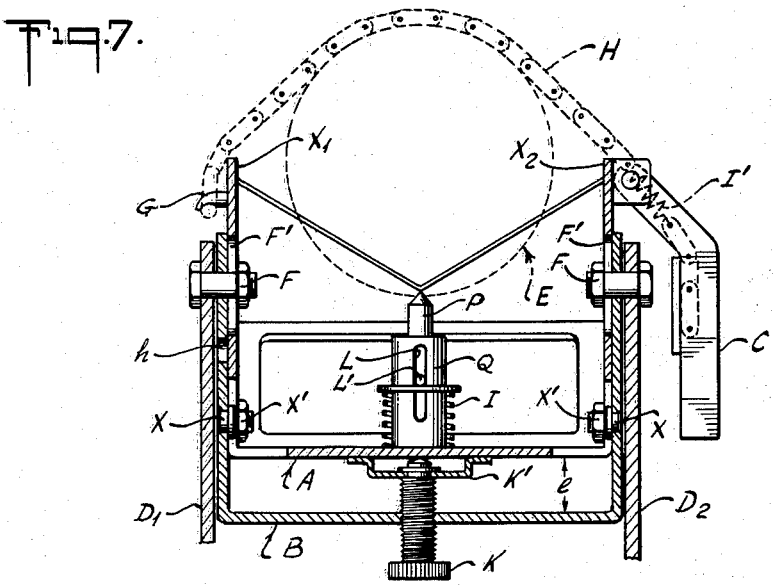
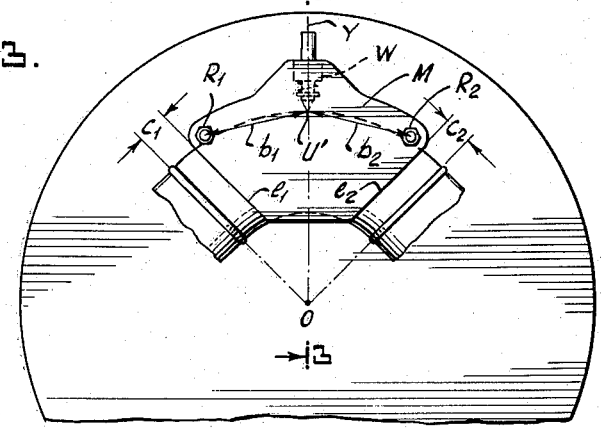
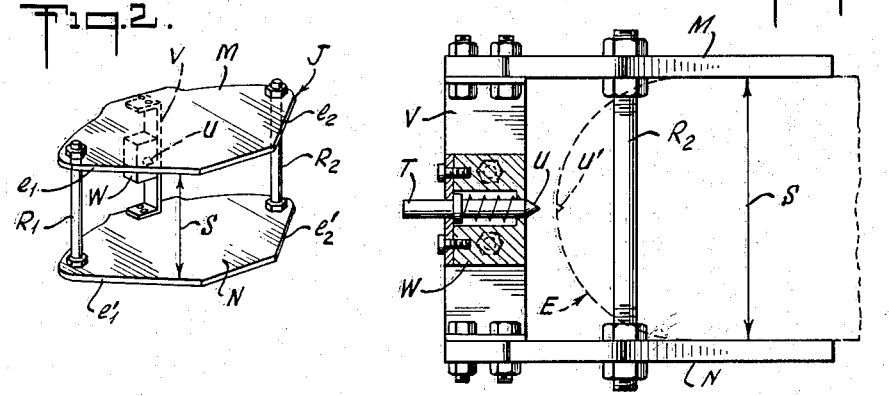

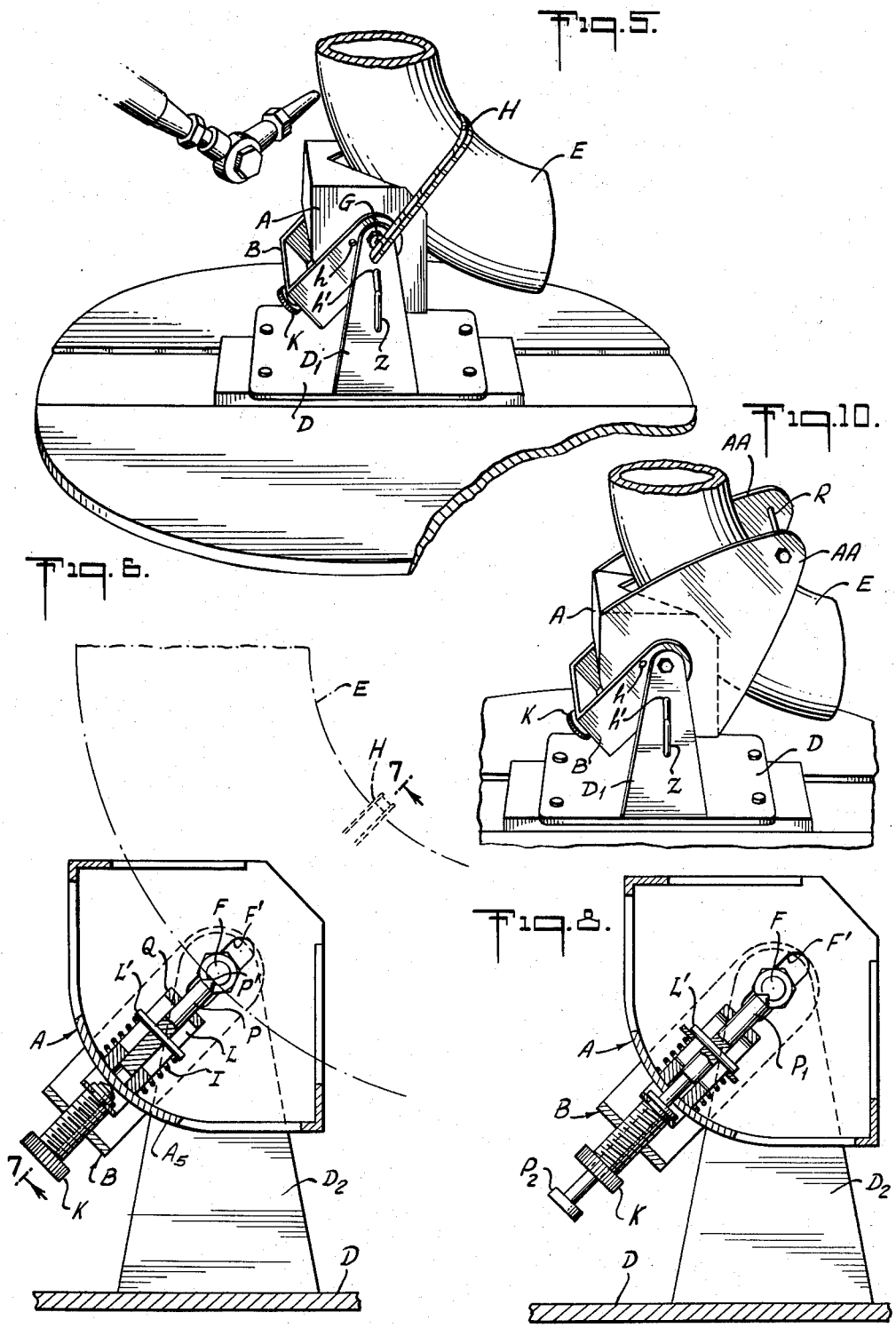

United States Patent Office 3,116,561
Patented Jan. 7, 1964

3,116,561
APPARATUS FOR USE IN TRUING THE ENDS OF WELDING FITTINGS
Bennie S. Liby, Port Arthur, and Edward R. Saunders, Jr., Port Neches, Tex., assignors to Texaco Inc., New York, N.Y., a corporation of Delaware
Filed Sept. 15, 1959, Ser. No. 840,043
9 Claims. (Cl. 33—189)

This invention relates generally to welding fittings or connections and specifically to an apparatus for the proper locating and positioning and the holding of a weld L or tube turn so that the ends may be trued with a metal cutting machine.

The increase in the use of welded pipe connections or fittings, such as weld L's and tube turns, in the oil industry to replace threaded fittings of similar type calls for practical economies in recovery operatoins for reuse of such connections or fittings. And even though such L's and other fittings are expensive steel forgings, prior art recovery practice resulted in their disposal as scrap, after recovery of the straight pipe sections.

In the case of the more extensive salvage programs, the ends of used welding fittings are trued up in machine shops on lathes and similar metal cutting machines, resulting in increased costs for handling and transportation to and from the relatively distant refinery or oil field. In addition, many users complained that the welding faces at the ends of 90° fittings were not true and square with respect to each other. More recently, the expensive and time-consuming use of machine tools to obtain true ends on the welding fittings has been replaced by flame cutting.

Although the recovery processes disclosed in recently issued patents have resulted in considerable savings, much time and effort are expended to adjust the salvaged fitting in proper working position in order to get the finished ends to be true and in correct shape for reuse. In addition, when the work pieces are not based on the same common dimension, i.e. short or long radius, further time and effort are required, since more adjustments are necessary.

A short radius weld L is one having a radius of curvature to the diameter of the tube, while a long radius weld L is one having a radius of curvature equal to 1½ times the diameter of the tube. Short and long radius weld L's are used primarily in plants and refinery construction, and only a few in oil field and pipe line construction, where long radius pipe bends are used almost exclusively. Long radius pipe bends are used in refineries where possible but in the compact piping required around operating units, it is necessary to use short and long radius weld L's in most cases.

Accordingly, it is an object of the present invention to provide an improved apparatus for the manufacture and/or recovery of welding fittings such as weld L's and tube turns.

It is another object of the present invention to provide an improved apparatus for positioning a work piece correctly in a metal cutting machine for further processing of the ends.

And another object of the invention is to provide an improved apparatus for locating and holding a work piece in a metal cutting machine for truing the ends.

Still another object of the invention is to provide an improved apparatus for the proper locating and positioning of a piece to be salvaged in a flame cutting machine.

These and other objects, advantages and features of the invention will become apparent from a consideration of the specification in the light of the figures of the accompanying drawings, wherein:

FIG. 2 is an isometric view of the basic form of the marking jig;

FIG. 3 is an illustration of the method by which the proper position of the work piece in the holding jig is determined through the set up in the marking jig;

FIG. 3a is a sectional view taken along line 3—3 of FIG. 3;

FIG. 5 is a diagrammatic showing of a flame cutting machine using the apparatus of the present invention;

FIG. 6 is a cross section view taken in the plane of the axis of the work piece, such as a weld L;

FIG. 7 is a cross section view taken along the line 7—7 of FIG. 6;

FIG. 8 is a modification of a holding jig for use also as a marking jig;

FIG. 10 is a modification of the holding jig with respect to the clamping of the work piece.

The objects of the invention are attained by means of apparatus which is used to locate a piece to be worked on or salvaged in proper position in a holding device so that the axis of rotation of the held piece is determinate with respect to that of a rotary metal cutting machine.

Figure 1:
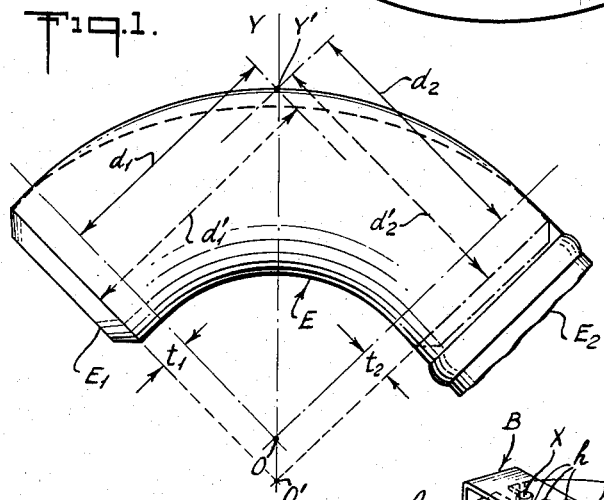
FIG. 1 is a showing of a typical welding fitting, such as a weld L or tube turn, used in oil field or refinery connections, with one end trued and finished for reuse, and the other end rough-cut, as would be received from the salvage yard.

Referring to FIG. 1, there is disclosed a work piece, in this case, a salvaged welding fitting in the form of a 90° weld L, E, with a finished or true end at $E_1$ and a rough-cut end at $E_2$. This particular L is represented with a slight amount of tangency ($t_1$, $t_2$) at each end. Other fittings may have no end tangency, in which case the outside surface of the weld L (or tube turn) would lie along the position indicated by the line of dashes in this figure. Even though weld L's and tube turns of the same nominal size may have different curvatures, as indicated by the dash and full lines in FIG. 1, they all have a common characteristic, viz. a common point of intersection of the axial distances indicated as $d_1$ and $d_2$, which are equal to each other, as are the corresponding distances in all other weld L's or tube turns of the same nominal size.

These axial distances are measured to their point of intersection from and perpendicular to the centers of the circular cross sections of the weld L made by the respective planes intersecting at the center of curvature of the weld L and passing through the points of tangency at each of the ends of the arc of the weld L, the point of intersection lying on an axis containing the radius of curvature which bisects the angle between the intersecting planes, as well as the arc of curvature of the weld L, and so can be described as a neutral axis.

In FIG. 1, the radius of curvature of the weld L with its center at O is indicated as on the reference axis O—Y, and the point of intersection thereon is at $Y'$, $d_1$ and $d_2$ being measured for the solid line weld L, with $d'_1$ and $d'_2$ being measured for the dash line weld L, whose center of curvature is shown at $O'$ and the bisecting radius of curvature on the axis $O'$—Y. In the case of a 90° weld L, the reference axis containing the radius of curvature bisects the angle between the intersecting planes into 45° each and pivotal movement of the positioned work piece about the point of intersection, when it lies exactly on the outside surface of the weld L, 45° in either direction will make the axis coincident with the axial distances $d_1$ and $d_2$ (or $d'_1$ and $d'_2$) coincident with the reference axis O—Y (or O'—Y).

If the point where the reference axis O—Y intercepts the outside surface of the weld L or tube turn can be marked, as by a punch, then the punch mark can be used as a reference point to position the weld L or tube turn in a holder or jig designed to support the work piece in proper position for rotary cutting of the rough or unfinished ends, so that the finished end, upon which the cut has been completed, would be in a plane which is parallel to the supporting face of the rotary cutting machine. Pivoting the work piece 90° with respect to the reference point and finishing the rotary cutting of the other end would result in the ends of the weld L being true and square with respect to each other.

Figure 1A:
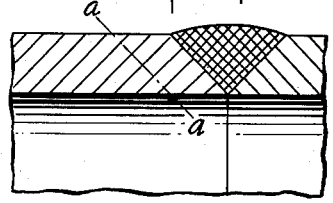
FIG. 1a illustrates the line of removal of the weld from the rough-cut end.

When the weld L's or tube turns are recovered from the field, the pipe line containing the welding fitting is cut to retain the welds on each end of the fitting. These welds are burned off in salvage to give a usable fitting which has an end bevel corresponding to that provided in the original fitting, less the portion which has been removed by burning off. FIG. 1a, represents two pieces of metal welded together, e.g. at the rough-cut end $E_2$ of FIG. 1. If it is desired to burn to the left of the original end, the burn will be made just to the right of the line a—a of FIG. 1a, and will result in the removal of all of the original welded end.

FIG. 2 is an isometric view of the marking jig, in which the welding fitting is marked for its proper positioning in a holding device or jig used on the turntable of the flame cutting machine. The marking jig, indicated generally as J, consists of parallel planar members, M, N, e.g. wooden board members or of other suitable material, held in spaced apart distance from each other, S, by the two parallel bolt clamping members, $R_1$, $R_2$, and a spacing member, V, each located along the outer edges of the jig J. The distance or spacing S is adjusted to give a snug fit for all welding fittings of the same nominal size. Therefore, the marking jig disclosed in FIG. 2 can be adjusted once and maintained with the correct spacing between the planar members (M, N) until there is a need for different spacing.

There is some clearance between the spacing member V and the outside or back surface of the fitting, as disclosed clearly in the cross-section of FIG. 3a. A spring loaded punch T, is mounted in box W, which is supported on member V, the position of this punch being such that when its sharpened point U contacts the fitting, it makes the impression indicated at U'. The point U is equidistant from the parallel members M and N, and the center lines of the bolts $R_1$ and $R_2$, i.e. the distances from M to U and N to U are one half of the spacing S and the projected distance $b_1$ is equal to the projected distance $b_2$, FIG. 3.

The position of the salvaged fitting is adjusted in the marking jig so that the fitting is tangent to the bolt members $R_1$ and $R_2$ and the distances from the edges $e_1$, $e_2$, $e'_1$, $e'_2$, of the parallel members M and N respectively, to the center lines of the welds at each end, indicated as $c_1$ and $c_2$, FIG. 3, are equal. The respective edges are at right angle to each other when used in a jig for a 90° weld L, and generally correspond to the intersection planes passing through the center of curvature. In other words, when the dimension $c_1+b_1$ is equal to the dimension $c_2+b_2$, the point U will lie exactly along the axis O—Y, as indicated in FIG. 3. When this condition has been attained, the punch T is struck solidly with a hammer or other instrument and the point U makes the impression U' upon the outside surface of the L.

Figure 4:
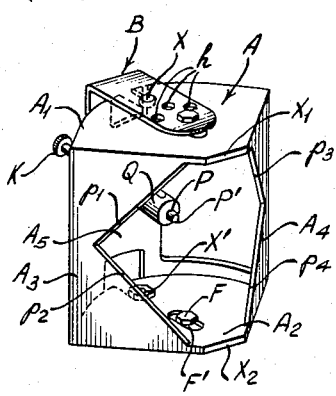
FIG. 4 is an isometric view of the holding jig used in the locating and positioning and the holding of the work piece.

FIG. 4 is an isometric view of the holding jig for use with a fitting on which the impression U' has been made in the marking jig. The holding jig (of FIG. 4) consists of the box shape cradle A and the U-shape cradle adjuster B. The cradle A includes the side flanges $A_1$ and $A_2$, supported in parallel relationship by the rectangularly disposed recessed end flanges $A_3$ and $A_4$ and the curved back flange member, $A_5$.

The end flanges have their cutaway recesses open on the receiving side of the holding jig so that when the work piece or fitting is placed thereon (see FIG. 5), contact with and support occurs at separate points along the edges $p_1$, $p_2$, $p_3$ and $p_4$, and with the pointed end P' of pin P. The recesses in the end flanges may have any shape so as to form a symmetrical pattern, but the simplest arrangement is rectangular, as that of the corner of a square, as disclosed in FIG. 4. The axis of the pin is located along the intersection of the planes passing through the longitudinal and transverse cross sections, shown in FIG. 6 and FIG. 7, respectively.

The pin P is positioned in the centering pin guide, Q, which has an elongated slot L in which the lock pin L', which fits through a hole in pin P, rides. A strong spring I is positioned between the lock pin and the bottom or inside surface of the curved back flange member $A_5$ of the cradle, and forces the centering pin against the outside surface of the welding fitting into the impression U' which has been placed thereon by means of the marking jig of FIG. 2.

The cradle is properly aligned with the cradle adjuster by means of bolts X (also see FIG. 7) which are peened to the upright arms of the cradle adjuster and pass through slots in the side flanges of the cradle, the cradle and adjuster being fastened together by means of the nuts, X' fitting on the bolts X and the pivot bolt and nut assemblies at F which operate in the slots F' in the side flanges of the cradle, thereby forming an integrated cradle means.

In addition, there is the cradle adjuster screw assembly at K including the screw which engages a threaded hole in the bottom of the cradle adjuster, the plain end of the screw fitting into a fastener plate K' attached to the outside surface of the curved back flange member of the cradle. By means of this cradle adjuster screw assembly, it is possible to align the axis of each axial distance with the axis of rotation of a rotary metal cutting machine, e.g. a flame cutter turntable, when the position of the point of contact between the end of the spring loaded pin P with the impression U' on the outside surface of the welding fitting does not coincide with the point of intersection of the axial distances (see FIG. 1). The adjuster screw assembly at K varies the distance $e$, FIG. 7, such adjustment being required to bring the axis of rotation of the workpiece into alignment with that of the turntable. This adjustment has the effect of making the axis of rotation pass through the point where the axial distances, $d_1$ and $d_2$ intersect. When this relationship exists, the upright or vertical leg of the fitting in the cradle (see FIG. 5) will rotate coaxially with turntable and the other leg will rotate therewith when the holding device has been rotated 90°. Following such distance adjustment, an additional arbitrary adjustment is necessary. Since the welding fitting wall thickness is greater on the inside curve of the fitting than on the outside curve, it is necessary to shift the fitting about 1/8" closer to the flame to compensate for this difference in metal thickness, i.e. toward the side on which the inside of the fitting is located. In FIG. 5, this would be to the right.

With reference to FIGS. 6 and 7, it is the cradle adjuster B which pivots about its axes of support by means of the bolt assemblies F passing through the vertical support standards at $D_1$, $D_2$ on the base D, which is clamped by means, e.g. wing nuts or bolts, to the sliding member on the rotary table of a flame cutting machine (see FIG. 5).

Referring back to FIGS. 4 and 5, the U-shape cradle adjuster has three similar holes, each indicated as $h$, into which holding pin Z may be inserted through a corresponding hole $h'$ in standard $D_1$, either for placing the work piece in proper position on the cradle, or to bring one or the other end of the welding fitting into position for truing.

When the pin Z is inserted into the center hole of the cradle adjuster, the cradle is in proper position, i.e. level, for receiving a work piece or welding fitting which has been marked with the reference impression U'. When the cradle adjuster is pivoted about its axis of rotation and the pin Z is placed in either of the two outer holes, one or the other end of the welding fitting is in position for truing. One of such outer holes is disclosed in FIG. 5, while the other two holes are behind the standard $D_1$, the pin Z engaging the other outer hole. These outer holes are positioned at 45° with respect to the axis of rotation of the turntable and the longitudinal axis of the U shape member.

The work piece or welding fitting is held in position in the box shape cradle by means of a holding chain H which engages the hook at G and is tightened in position against spring I' by the handle C. A turn buckle or other tightening means could be used also. After one end has been trued, the entire holding jig or device is rotated 90° by positioning the holding pin in the opposite outer hole. A slight correction in position of the base D may be required to obtain a satisfactory truing of the ends but such adjustment is conventional.

The disclosure of the marking jig of FIG. 2 and the holding and positioning device of FIG. 4 have been restricted specifically for use with a 90° weld L. However, the holding device as disclosed herein can be used also with other angular weld L's, as, for example, in the case of 180° return bends, which could be cut by a flame cutter, just as a 90° weld L is cut, and could be held in a vertical position by a holding device similar to the one described herein. It would be necessary to shift the entire holding device and the return bend to the right or to the left on the turntable to make the axis of the axial distance of each leg of the return bend coaxial with the axis of rotation of the turntable.

Figure 9:
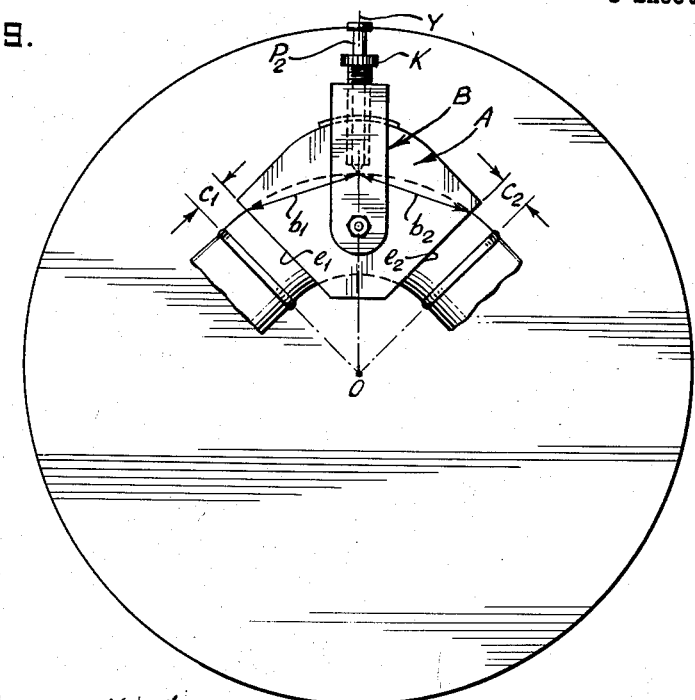
FIG. 9 is a view parallel that of FIG. 3 and is an illustration of the manner for determining the proper position of the work piece in the modified holding jig of FIG. 8.

FIGS. 8 and 9 show a modification whereby the holding jig may also be used as a marking jig. This involves the combination of the structures of FIGS. 2 and 4, wherein the pin P (see FIG. 6) telescopes through the adjusting knurled screw of the assembly K. This modified pin, indicated as $P_1$, FIG. 8, functions not only to engage any impression which may have been made at the reference point U' on the outside or back surface of the welding fitting when a separate marking jig has been used previously, and to keep this point in such position that it will lie along the axis O—Y, as disclosed in FIGS. 1 and 3, but also to locate the same point, as shown in FIG. 9, which discloses the same principles for determining the point of intersection of the axial distance, $d_1$ and $d_2$, with the same lettering being used for the same or similar features. Since the manner of support of the cradle, the cradle adjuster and the cradle holder are the same as in the basic structure, along with the tie down or holding chain H and its supporting features, no further description of this modification of FIGS. 8 and 9 will be made.

FIG. 10 shows another modification of the holding jig for clamping the work piece in position. Since the welding fittings are forgings which have diameters of the same nominal size that do not vary by more than about 1/64 of an inch, it is feasible to use a holding jig wherein it is possible to pull the sides together to serve as a clamp. This is done by means of a tightening nut and bolt assembly at R which draws together the elongated side flanges AA, AA, to clamp the welding fitting without throwing it too much out of position insofar as the vertical alignment is concerned. This modification would require a holding jig for different diameters of the welding fitting, as contrasted with the more universal holding jig disclosed in FIGS. 5 and 7, in which the work piece is held in position by the chain H.

Since the work piece or fitting is inserted into contact with the recessed end flanges $A_3$ and $A_4$ and has point contact along the surfaces $p_1$, $p_2$, $p_3$ and $p_4$ (and contact with the pointed end P' of pin P), the size limit of work pieces is controlled by the spacing between the side flanges $A_1$ and $A_2$ and specifically by their edges at $X_1$ and $X_2$, so that considerably larger work pieces could be used with the modification of FIGS. 8 and 9 than is possible with the marking jig of FIG. 3. Also, the lower limit would be determined by the restraining chain. Consequently, once the work piece has been centered in the manner disclosed in FIG. 9, the outer exposed end $P_2$ of pin $P_1$ may be struck to form an impression U' on the outside for reference purposes.

Thus, there has been shown and described a novel apparatus for the locating and positioning and the holding of a welding fitting so that it is possible to true both ends of a welding fitting with great ease and economy and with the ends at a determined angular relationship with each other. Although the disclosure herein has been directed specifically to the use of a flame cutting apparatus, the principles disclosed herein can be used on other rotary metal cutting machines, such as a lathe, vertical boring mill, drill press and the like, where it is necessary that the axis of rotation of the machine as well as that of the work piece be coincidental.

Although modifications and variations of the invention as set forth above may be made without departing from the spirit and scope thereof, only such limitations should be applied as are indicated in the appended claims.

We claim:

1. An apparatus for holding a curved tubular welding fitting such as a weld L and tube turn in a metal cutting machine having a rotatable work table comprising the combination of support and integrated cradle means, said support means including a base with a pair of parallel standards extending upward therefrom, said cradle means being pivoted thereon therebetween and including adjusting and positioning members, the positioning member being adapted to locate the intersection with the outside surface of said fitting of an axis containing the radius of curvature of said fitting passing through the point of intersection of the axial distances measured perpendicularly from the centers of the true ends of said fitting, the adjusting member being interconnected with said locating member for positioning said fitting so that its axis of rotation is coincident with that of said work table.

2. An assembly for use in the recovery of a curved tubular welding fitting such as a weld L comprising a support adapted to be secured to an adjustable base on a rotary turntable of a flame cutting machine, a pair of upright parallel standards extending from said support, means supported between said standards including a cradle member for receiving a fitting therein and adjustable means in engagement with said cradle member and pivoted on said standards for positioning the fitting with respect to said base, and means for locking said last mentioned means with respect to said standards ranging through a 90° arc.

3. An apparatus for holding in a metal cutting machine a welding fitting such as a weld L or tube turn in proper position for truing and squaring the ends with respect to each other comprising a pair of opposed side flanges and a pair of end flanges having recesses with the same symmetrical pattern about their neutral axes and held in spaced relationship by said side flanges, and a curved back flange joined to said side and end flanges to form an open cradle therewith, means for pivoting said cradle in an adjustable position about a rotatable member comprising a U-shape member enclosing said cradle from the side of said back flange and joined to said cradle, means for adjusting the position of said cradle to said last mentioned means joined thereto and to said back flange of said cradle, and support means joined to said means for pivoting said cradle in pivotal arrangement therewith, said proper position comprising the coincidence of the axis of rotation with the respective axes containing the axial distances measured perpendicularly from the centers of the true ends of said fitting, said cradle including a locating means with an axis at the intersection of the planes through the neutral axes of the side and end flanges.

4. In the apparatus as defined in claim 3, means for holding said fitting in position in said cradle for cutting off the ends thereof and comprising an adjustable chain.

5. In the apparatus as defined in claim 3, means for retaining said fitting in said cradle comprising a bolt and nut clamping assembly, said side flanges being extended beyond the diametral dimension of said fitting and having perforations for receiving said clamping assembly.

6. A device for properly locating, positioning and holding a welding fitting such as a weld L or tube turn for truing and squaring the ends in a metal cutting machine having a rotary support member comprising an open face cradle member consisting of a first pair of parallel planar members serving as side flanges, a second pair of planar members serving as end flanges joined to said first pair and lying in planes normal to each other, and a back flange joined to said side and end flanges, said end flanges having the same cut out portions symmetrical with respect to the neutral axis of each of said end flanges, a marking and locating means for indicating on the outside surface of said fitting the intersection therewith of an axis containing the radius of curvature which extends through the point of intersection of the axial distances measured perpendicularly from the centers of the true faces at the ends of said fitting when centered in said cradle members, the axis of said marking and locating means being at the intersection of planes through the neutral axes of said side and end flanges, pivot and adjusting means for said cradle member comprising a U shape member enclosing said cradle member from said back flange thereof and joined to said side flanges in sliding relationship therewith, said adjusting means being joined to the back flange of said cradle member and being in telescoping relationship with said marking and locating means, means for pivotally supporting said U shape member being adapted to be held in rotative arrangement on the metal cutting machine, means for holding said fitting on said cradle member, and means for locking said pivot and adjusting means in a determinate position in a range of 90°.

7. In combination in a metal cutting apparatus, a base member having standards for rotative support with means for positioning properly and holding a welding fitting for rotative finishing of ends thereof comprising a cradle member consisting of a first pair of spaced apart substantially parallel planar members and a second pair of planar members for maintaining said first pair of planar members in fixed spaced relationship, the members of said second pair being in planes normal to each other and comprising end flanges for spacing equidistantly therefrom said ends of said fitting, means spaced equidistantly between said planar members and having its axis at the intersection of the planes through the longitudinal and transverse sections of said cradle member whereby the intersection at the back surface of said fitting of the axis containing the radius of curvature passing through the point of intersection of the axial distances measured perpendicularly from the centers of the true ends of said fitting may be indicated, means for pivoting and adjustably supporting said cradle member comprising a U shape member, and means for adjusting the position between said U shape member and said cradle member, and means for selectively positioning said U shape member with respect to said standards whereby said cradle member may be rotated through an arc wherein said standards maintain a bisecting relationship with respect to the outer limits of the positions.

8. A marking jig for locating on the outside surface of a tubular welding fitting such as a weld L or tube turn the intersection therewith of an axis containing the radius of curvature of said fitting passing through the point of intersection of the axial distances measured perpendicularly from the true end faces of said fitting and comprising a pair of spaced planar members having a generally sector-like configuration with a pair of straight edges extending at right angles to each other for defining said configuration and a pair of spacing means for maintaining said planar members in fixed parallel relationship to each other joined thereto and located at the outer ends of said straight edges, and a fixed means located equidistantly between said planar members and from said spacing means for indicating said intersection, said last mentioned means including a punch and interconnecting said planar members, said jig being adapted to enclose said welding fitting between and in contact with said planar members and said spacing means whereby said straight edges are located adjacent the true end faces of said fitting.

9. A device for indicating the proper holding position in a metal cutting apparatus of a tubular curved work piece having ends to be removed and requiring rotation of said work piece during the removal of said ends comprising a pair of spaced planar members having a generally sector-like configuration with a pair of straight edges meeting in projection at right angles to each other, a pair of means for retaining said planar members in spaced apart fixed parallel relationship interconnected therewith at the outer edges of said members and at the outer ends of said straight edges, and a single means for locating a reference point on said work piece for the determination of its axis of rotation with relation to said apparatus spaced equidistantly between said planar members and from said last mentioned means and being supported by said planar members, said device being adapted to receive said tubular curved work piece thereby enclosing the same between said planar members and in contact with the pair of retaining means whereby said pair of straight edges are adjacent said ends to be removed.

References Cited in the file of this patent

UNITED STATES PATENTS

| | | |
|---|---|---|
| 824,975 | Cook | July 3, 1906 |
| 1,392,130 | Engstrom et al. | Sept. 27, 1921 |
| 2,464,444 | Gantz | Mar. 15, 1949 |
| 2,595,137 | Hagopian | Apr. 29, 1952 |
| 2,734,737 | Scardina | Feb. 14, 1956 |
| 2,805,057 | Bain | Sept. 3, 1957 |

UNITED STATES PATENT OFFICE
CERTIFICATE OF CORRECTION

Patent No. 3,116,561 January 7, 1964

Bennie S. Liby et al.

It is hereby certified that error appears in the above numbered patent requiring correction and that the said Letters Patent should read as corrected below.

Column 1, line 13, column 2, lines 1 and 42, column 3, lines 6 and 8, column 6, lines 31 and 59, column 7, line 14, and column 8, line 11, for "tube turn", each occurrence, read -- similar pipe fitting --; column 1, lines 16 and 55, column 2, lines 44 and 50, and column 3, line 18, for "tube turns", each occurrence, read -- similar pipe fittings --.

Signed and sealed this 7th day of July 1964.

(SEAL)
Attest:

ERNEST W. SWIDER
Attesting Officer

EDWARD J. BRENNER
Commissioner of Patents